United States Patent Office 2,749,033
Patented June 5, 1956

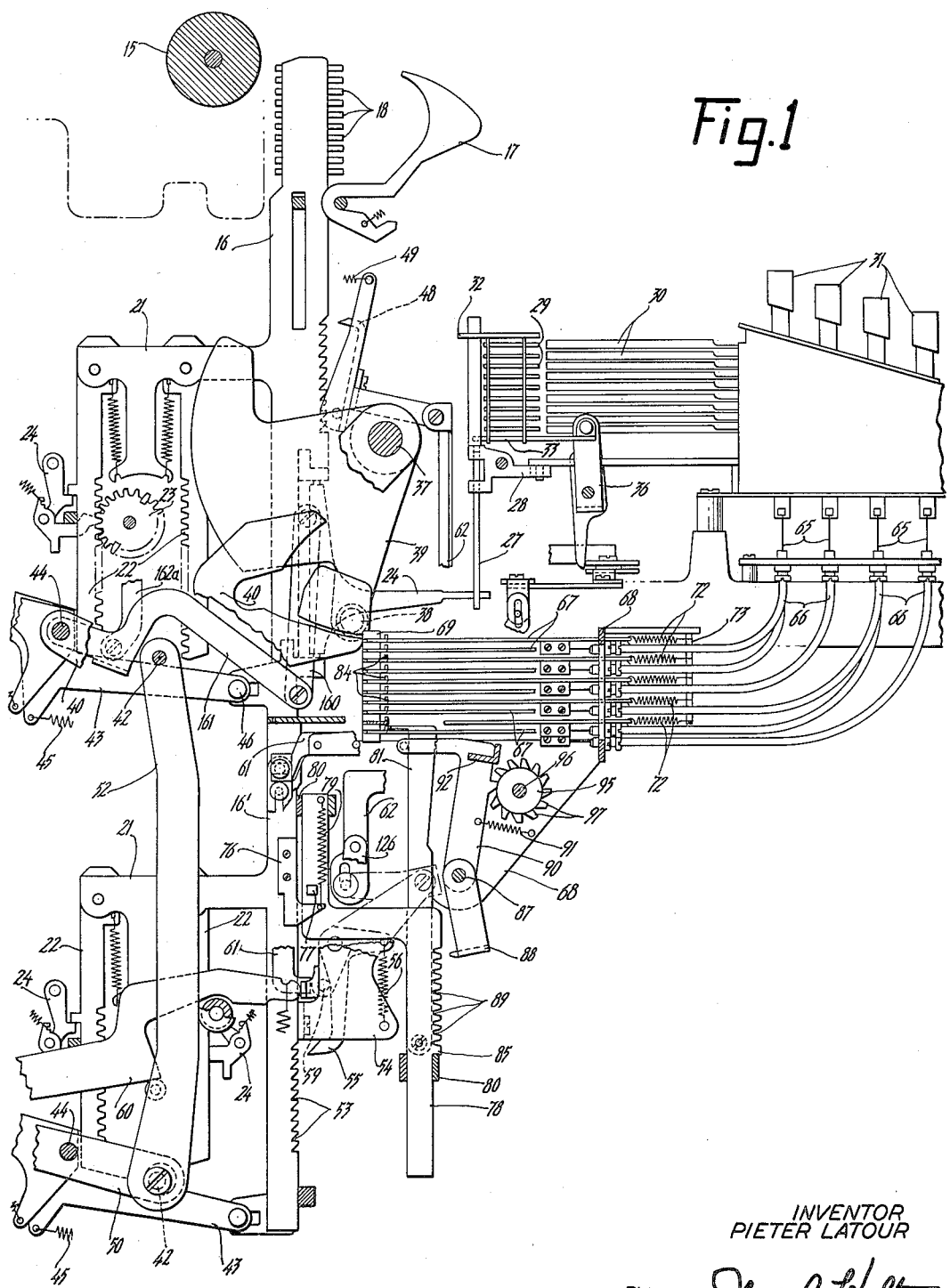

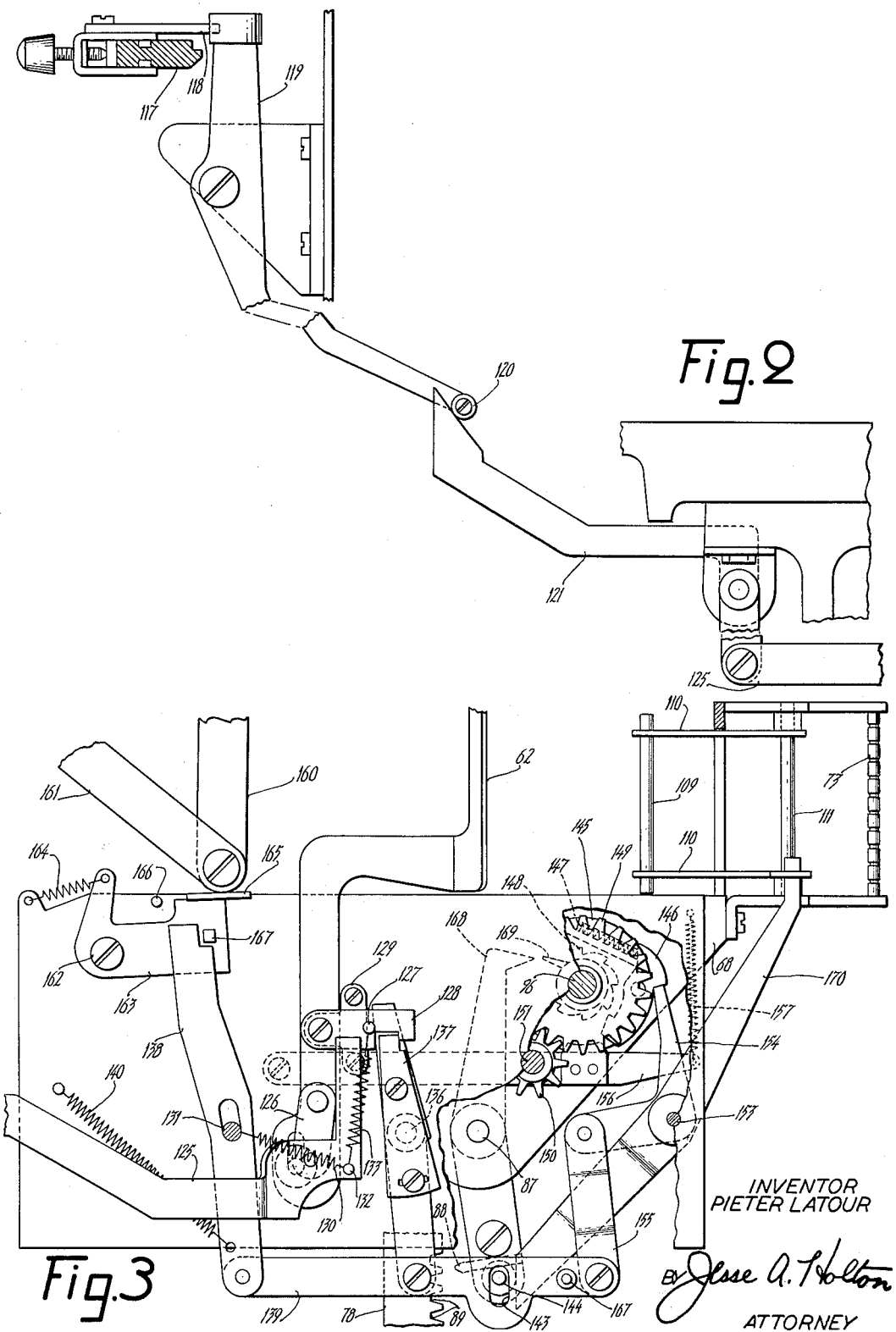

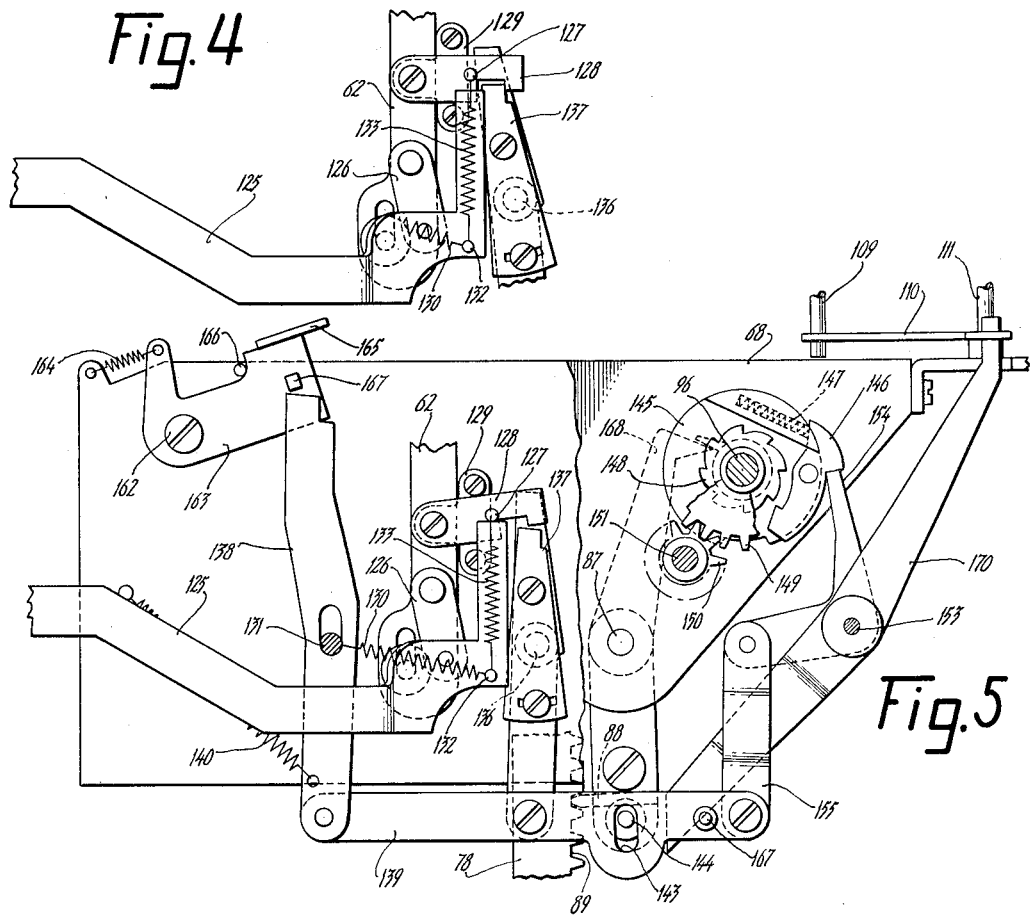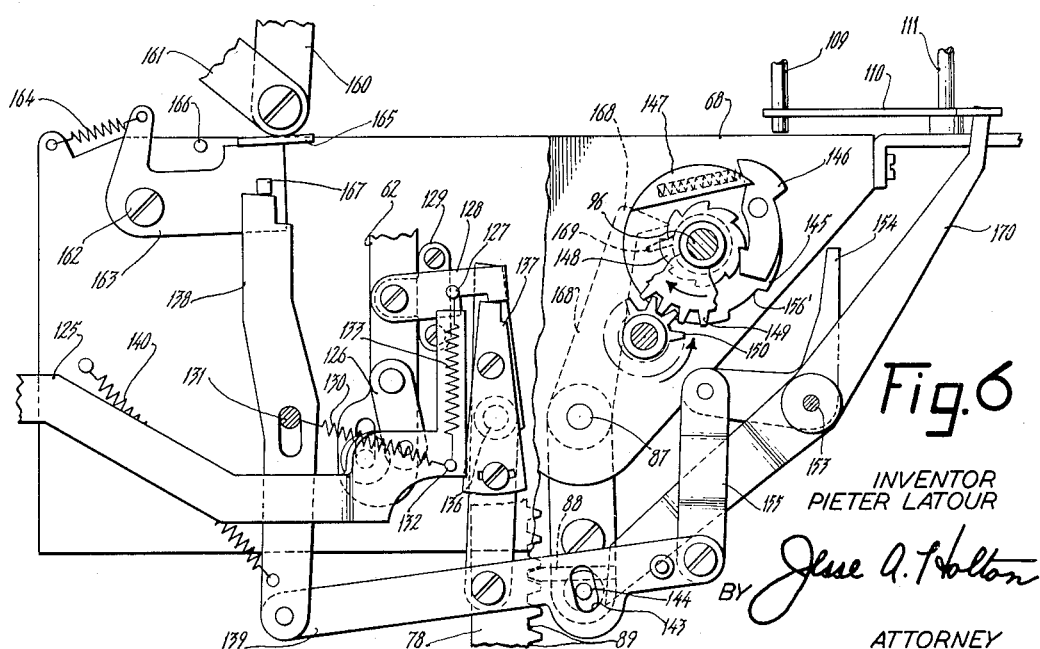

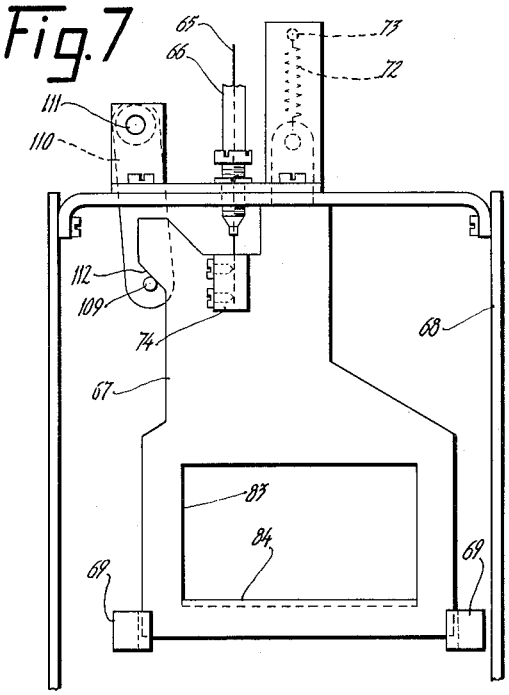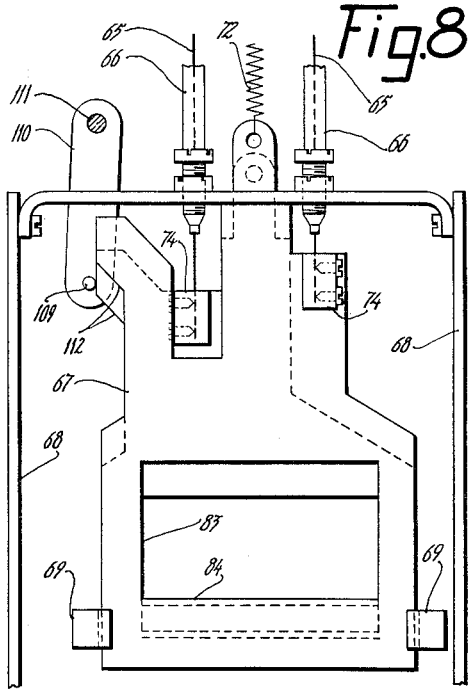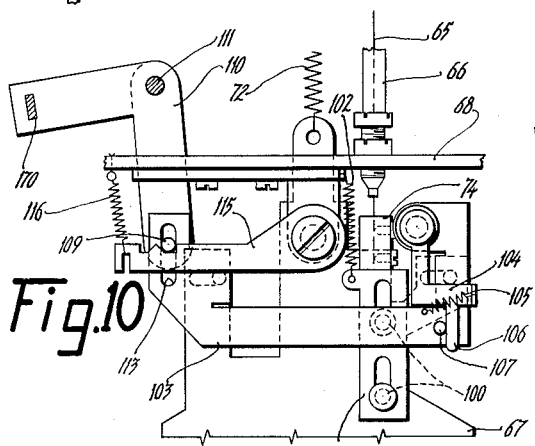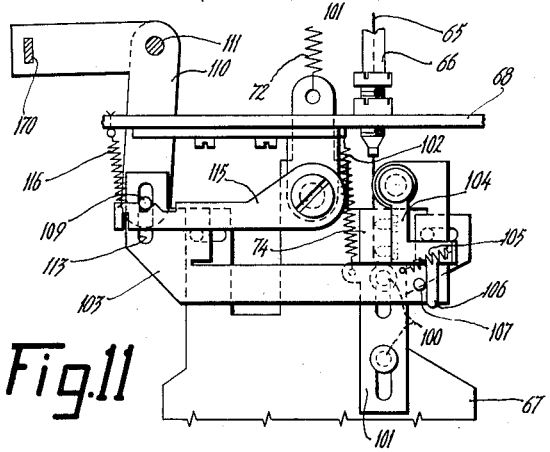

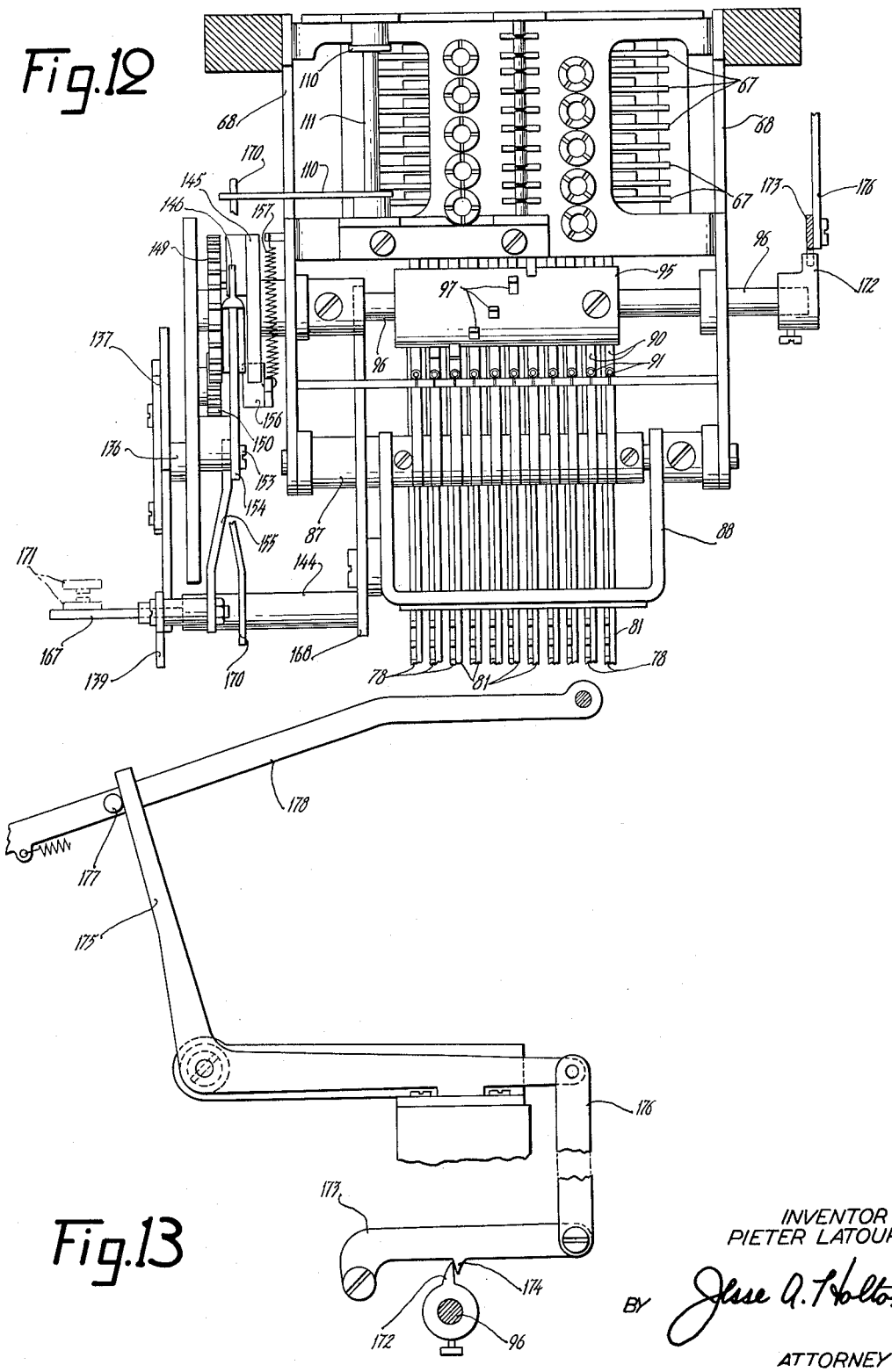

2,749,033

MECHANISM FOR REINDEXING A TOTAL IN AN ACCOUNTING MACHINE

Pieter Latour, Amsterdam, Netherlands, assignor to Underwood Corporation, New York, N. Y., a corporation of Delaware Application August 11, 1953, Serial No. 373,630

11 Claims. (Cl. 235—60.31)

This invention relates to mechanism for automatically indexing an amount on the keys of a ten key accounting machine, more particularly to a device for operating the keys of a ten key keyboard to re-index in the indexing mechanism the amount of a total printed by the type bars.

It is well known that multiplication may be performed in adding machines by repeated addition of an indexed amount with the indexing of a zero when required to enable multiplication by higher order multipliers. It has not, however, been possible to utilize amounts accumulated on a register as a multiplicand for no denominational shifting mechanism for the register has been available to permit use of multidigit multipliers.

It is then one object of the present invention to provide a device whereby an amount standing on a register may be indexed on the keys of a ten key keyboard for use as a multiplicand.

Another object of this invention is to provide in such a total re-indexing mechanism, means to re-index only the significant figures of the total.

A further object is to provide a total re-indexing mechanism which may be applied to an accounting machine without loss of any functions of the machine and which mechanism may be automatically effective under control of the accounting machine carriage.

Still another object is the provision of such a mechanism whose operation may be automatically initiated during any total cycle of the machine and which will initiate further automatic machine operations after the total has been re-indexed on the keys to enable completely automatic machine operations after the original entries have been made in the register.

Other objects will be apparent from the appended drawings and the following detailed description of one preferred embodiment of the invention.

In the accompanying drawings:

Figure 1 is a side section of an accounting machine showing the manner in which the structure of the present invention is applied thereto, Figure 2 is a side view showing a part of the control linkage to initiate an automatic re-indexing cycle, Figure 3 is a left side view showing the remainder of the control linkage of Figure 2 in a normal position, Figure 4 is a view of a portion of Figure 3 showing the control linkage in its position at the start of a total cycle in which the total is to be re-indexed, Figure 5 is a side view similar to Figure 3 but showing the positions of the parts at the middle of a total taking cycle, Figure 6 is a side view of the parts of Figure 3 showing the positions during the total re-indexing cycle, Figure 7 is a bottom plan view of the indexing slide for one of the odd number keys, Figure 8 is a bottom plan view of the indexing slide for an even number key and showing one of the odd number slides in actuated position, Figure 9 is a bottom plan view of the slide of the "0" key in a non-actuated position, Figure 10 is a bottom plan view of a part of the mechanism of Figure 9 showing the positions of the parts when a non-significant "0" is sensed, Figure 11 is a bottom view similar to Figure 10 but with the parts in positions for sensing a significant "0,"

Figure 12 is front elevation of the mechanism of this invention, and,

Figure 13 is a right side view showing the structure to initiate an automatic machine cycle after a total has been re-indexed upon the keyboard.

General description

The present invention is shown as applied to the well-known "Sundstrand" accounting machine disclosed in U. S. Patent No. 2,194,270, issued March 19, 1940 to Oscar J. Sundstrand. This machine includes a travelling carriage, printing devices, at least one register and a ten key keyboard for indexing of amounts to be printed or entered into the register or registers. Totals or sub-totals may be printed by engaging the register to be totalled with the printing devices before they are moved to printing positions and using the tens transfer members to arrest movement of the printing devices when the register wheels are individually returned to a zero position. In the machine according to the present invention, each printing device always carries with it, in the advancing direction, a separate member which will also be positioned at a position represented the associated digit of the amount printed. When the total or sub-total which is to be re-indexed on the keyboard is printed, the separate members are retained in their advanced, total representing positions until the end of the total cycle. The members are then actuated seriatim from the highest to the lowest denominational orders to operate selected ones of the ten digit keys to re-index the total amount. The separate members are thereafter released for return to normal position with respect to the printing devices and the machine given an automatic machine cycle to continue with the problem being performed.

The re-indexing mechanism includes a device which will eliminate non-significant zeros during the re-indexing but which will be shifted when any digit key other than zero is operated to thereafter operate the zero key for each zero of the total.

Specific description

More specifically described and referring to Figure 1, the present machine includes a platen 15 rotatable in a laterally shiftable carriage and around which a work sheet is held to receive printing imprints from a plurality of type bars 16 vertically movable in front of the platen 15. Hammers 17 individual to each type bar are provided to drive one of the type 18 carried by the bar 16 against platen 15 for printing. A rearward extension 21 of each type bar 16 carries two racks 22 which are alternatively engageable by a register 23 for addition and subtraction operations. A tens transfer mechanism 24 is associated with each set of racks 22 to provide for carrying of tens in addition or subtraction and to arrest the register wheels at "0" during total or sub-total taking operations.

Pivoted to the front side of each type bar 16 is an arm 24 connected to a slidable tail pin 27. The tail pins 27 are supported for vertical movement in a sliding frame 28 and are laterally shiftable into alignment with successive rows of settable pins 29. Pins 29 are set to intercepting position with tail pins 27 by a set of push rods 30, shiftable across the pins 29 by sliding frame 28 and each operable by an associated numeral key 31. There are ten digit keys 31, one for each push rod 30 except that there is no push rod or settable pins 29 corresponding to a 9, a permanent stop 32 being all that is necessary. In a non-indexed position, all of the tail pins 27 lie under a slidable zero stop plate 33 from which they are moved into alignment with pins 29 as the pins are indexed.

The type bars are raised from their Figure 1 position to a printing position by a main shaft 37 which rotates about 90° clockwise and then returns counterclockwise to normal position. A roller 38 on an arm 39 fixed to shaft 37 engages cam arm 40, shown broken in Figure 1 to enable a clear showing of other parts, to rock the arm 40 upwardly and then return it to normal during each cycle of shaft 37. There is one arm 39, roller 38, and arm 40 on each side of the machine. A rod 42 connected between the two arms 40 overlies a group of arms 43 pivoted on a shaft 44 and tensioned upwardly by springs 45. Each arm 43 has a stud 46 in its forward end which stud is positioned in a notch in a type bar 16.

During a machine cycle, clockwise rotation of shaft 37 rocks cam arm 40 upwardly to move rod 42 from above arms 43 which then move type bars 16 upwardly until the type bars are arrested. If an item is being entered from the keys 31, the register 23 is moved into a neutral position between racks 22 and the bars 16 are arrested by the stops 29 which have been set, or by stop plate 33. During a total taking cycle, register 23 is left in engagement with racks 22 and the stop plate 33 is withdrawn from above tail pins 27 which must all be in the non-indexed position under plate 33. The type bars 16 in this operation then rise until the associated register wheel of register 23 is arrested by the transfer mechanism 24, thus setting the type bars 16 to represent the total contained in register 23. In either type of operation, when the bars 16 are positioned at the limited position, an aligner bar 48, tensioned by a spring 49, is released to engage notches in the type bars 16 and align the type 18 at the printing point.

During the return stroke of shaft 37, the hammers 17 are released to print the set up amount on a work sheet, aligner bar 48 is moved away from bars 16 and type bars 16 are then returned to their lower home position. If an item is being entered from keys 31, the register 23 is engaged with racks 22 prior to their return to home position but if a total is being taken, the register is withdrawn from racks 22 prior to this time. Further details and a more complete disclosure of the structure thus far described may be had by reference to the above noted Sundstrand Patent No. 2,194,270.

A lower adding section is provided below the above described structure. This lower section includes a number of type bar extensions 16', each of which is secured to an upper type bar 16 and has a rearward part 21, racks 22, a register 23 and tens transfer mechanism 24 duplicating those of the upper section. A pair of pivoted arms 50, one on each side of the machine, is connected by a restoring bar 42 which overlies the arms 43 connected to the lower ends of extensions and urged counterclockwise by springs 45. This structure is a substantial duplicate of that in the upper section and is provided to compensate for the additional load imposed by the additional mechanism. The arms 40 of the upper section and 50 of the lower section are connected by a link 52 to move in unison. Further details and the manner in which this lower section cooperates with the other machine parts are disclosed in U. S. Patent No. 2,209,240, issued July 23, 1940, to Oscar J. Sundstrand.

A hold down device to prevent the type bars 16 and extensions 16' from jumping upwardly during total taking cycles is included in the present machine. This structure is fully described in U. S. Patent No. 2,620,973, issued December 9, 1952, to Walter A. Anderson and will be but briefly described herein. Each type bar extension 16' has a set of notches 53 formed therein at the spacing of the type 18 of type bar 16. Mounted in a frame 54 are a plurality of detents 55 which are urged by springs 56 into engagement with notches 53. The detents 55 are retained in non-engaging position by a bar 59 which is held by a cyclically operating arm 60, by a stop 61 connected to the zero stop lever 36 and by a link 62 connected to aligner bar 48. The link 62 is used in connection with the present invention.

*Keyboard actuator*

The total represented by the positions of type bars 16 at the middle of a total taking cycle is automatically indexed on the pins 29 by operation of keys 31. As shown in Figure 1, the lower end of each key 31 is connected by a wire 65 which passes through a tube 66 to one of a plurality of slides 67. Referring to Figures 7 to 12 inclusive, there are ten slides 67, one for each key 31, and the slides 67 are of three different forms. The slide 67 in Figure 7 is representative of those for the odd value keys 1, 3, 5, 7 and 9 while the slide 67 of Figure 8 is representative of those for the even value keys 2, 4, 6 and 8. The slide 67 for the zero key 31 is shown in Figures 9, 10, and 11 and will be more completely described at a later point. Each slide 67 is supported for forward and rearward movement in a frame 68 secured to the main machine frame and in two slotted guide bars 69 similarly secured. The forward ends of the slides 67 are formed with perforated tongues passing through slots in the forward section of frame 68 and are connected by springs 72 to a rod 73 secured in the frame 68 to hold the slides in a forward position. A perforated block 74 is fixed to each slide 67 to secure the wire 65 to the slide 67, and as shown in Figure 8, the alternate slides have their blocks 74 on opposite sides to enable a more compact arrangement.

*Slide selecting mechanism*

Referring again to Figure 1, there is a slide selecting device for each type bar 16 to enable transfer of a total digit to the slides 67 and the keys 31. Each type bar extension 16' has secured thereto, a plate 76 which is positioned under a stud 77 fixed in a slide 78, a spring 79 connecting the plate 76 and slide 78 to hold the stud 77 against plate 76 whenever permitted. There is one slide 78 for each type bar 16 and all slides 78 are vertically movable in slotted guides 80 to move with the type bars. Each slide 78 carries an arm 81 pivotally secured thereto, all arms 81 being formed with a rearwardly extending upper ear and all passing through slots 83 in slides 67. The rearward edge of each slot 83 is turned upwardly to form a flange 84 against which the ears of arms 81 may strike.

The slides 78 are normally positioned with the ears of arms 81 aligned with the flange 84 of the zero slide 67 by engagement of a shoulder 85 thereon with the lower guide bar 80. In this position of slide 78, plate 76 is one step below the stud 77 of slide 78, for in the present machine, type bars 16 are normally positioned with the zero type 18 one step below the printing point and all bars 16 move one step upwardly to come to a zero position. During any printing cycle, the type bars during their movement to the indexed printing positions will carry slides 78 along with them to position the ears of arms 81 in front of the flanges 84 of the slides 67 corresponding to the printed digits. Generally slides 78 will return with type bars 16 to the lower position but if it is desired to index on keys 31 the number which has been printed, the slides 78 may be retained in their amount representing positions during return of bars 16 by a bail 88 pivoted on a shaft 87 and engaging in notches 89 of slides 78.

While the slides 78 and arms 81 are so positioned, the arms 81 are rocked rearwardly by arms 90 pivoted on frame 68 and yieldingly held in a clockwise position by springs 91. The arms 90 are guided in a slotted comb plate 92 and each arm retains an arm 81 between a shoulder on the arm and a stud secured therein. Arms 81 and 90 are rocked counterclockwise seriatim, starting from the highest denominational order by a drum 95 secured to a shaft 96 in frame 68, the drum having a plurality of teeth arranged spirally thereon to engage arms 90, see also Figure 12. As each arm 81 is rocked, the ear thereon will engage the flange 84 of the slide 67 with which it is aligned to move the slide 67 rearwardly and through wire 65 depress the key 31 corresponding to the position of slide 78, thus re-indexing on pins 29 the amount just printed by type bars 16.

*Zero elimination mechanism*

Inasmuch as a total being printed does not usually extend to the highest denomination of the register 23 and the transfer of the total to keys 31 starts at the highest denomination, it is desirable to eliminate the operation of the zero key 31 for the non-significant zeros. The mechanism for such elimination is shown in Figures 9, 10 and 11 and is all arranged adjacent the zero slide 67. In Figure 9 the slide 67 is shown in the normal position and it may be seen that the slide 67 is not directly connected to the wire 65 but instead carries two studs 100 to slidably mount a slide 101 carrying the block 74. A spring 102 connected between slide 101 and frame 68 tensions slide 101 forwardly. Also carried by zero slide 67 and movable across the slide is an interponent 103 pivotally mounting an L-shaped arm 104. A spring 105 connected between interponent 103 and arm 104 yieldingly determines the normal position of arm 104 with a finger 106 thereof against a stud 107 in interponent 103. In the normal position of Figure 9, the arm 104 is to the side of slide 101 and therefore when zero slide 67 is driven rearwardly to the position of Figure 10, arm 104 does not engage slide 101 to actuate the zero key 31.

The operation of any slide 67 other than that for the zero key indicates that the highest significant digit of the total has been reached and any further zeros appearing in the total should be indexed on the pins 29. Such an indication of a significant digit is provided by a rod 109 fixed in arms 110 pivoted on a shaft 111. As shown in Figures 7 and 8, each slide 67 for a digit other than zero is formed with a cam shoulder 112 against which rod 109 normally rests. When any slide 67 moves rearwardly to operate a key 31, its shoulder 112 cams rod 109 to the position shown in Figure 8. Referring to Figures 9 to 11, the lower end of rod 109 projects into a slot 113 formed in interponent 103 and when rod 109 is cammed outwardly by any shoulder 112, it moves the interponent leftward to the position of Figure 11. A detent 115 pivotally mounted on frame 68 is tensioned by a spring 116 into engagement with rod 109 to retain the rod and interponent 103 in either set position. In the leftward, Figure 11, position of interponent, arm 104 is positioned in front of a shoulder of slide 101 and will when slide 67 is actuated transmit such motion to slide 101 to operate the zero key 31.

*Cycle control of re-indexing mechanism*

The mechanism by which shaft 96 and drum 95, Figure 1, are given a cycle of rotation to transfer the amount set on slides 78 to the index pins 29 as above described, is shown in Figures 2 to 6 inclusive. Referring to Figure 2, the re-indexing mechanism is normally inactive and is settable to re-index a printed amount, generally only a total or sub-total, at a desired columnar position of the platen 15 with respect to the type bars 16. A bar 117 secured to the carriage of the machine and movable with platen 15, has secured thereto a cam 118 in position to engage and rock forwardly a lever 119 when the platen is positioned in a column to receive the amount to be reindexed. Lever 119 is pivoted on the machine frame and has at its forward end, a roller 120 engaging a cam surface on a rearward arm of a second lever 121 also pivoted on the machine frame. A link 125 is connected to the other arm of lever 121 and extends forwardly therefrom to connect with another link 126 pivoted on aligner link 62, Figures 3 to 6. In the normal position of link 125, Figure 3, a forward upstanding end thereof is positioned to the rear of a stud 127 fixed in a latch 128 pivoted on a bracket 129 secured in a sidewall of the machine frame. A spring 130 connected between a stationary stud 131 and a stud 132 in link 125 retains link 125 and levers 119 and 121 in their normal positions while a spring 133 connected between studs 127 and 132 tensions latch 128 downwardly. When cam 118 contacts lever 119 to rock levers 119 and 121, link 125 is moved forwardly to place its forward end under stud 127 of latch 128 as in Figure 4.

It will be remembered that aligner bar 48, Figure 1, is engaged with the type bars 16 at about the mid point of a machine cycle and raises link 62 to engage detents 55 in notches 53 during a total cycle. If the cam 118, Figure 2, is engaged with lever 119 at such time, the upward movement of link 62 transmitted through link 126 will lift the forward end of link 125 to raise the latch 128 and prepare the mechanism for a re-indexing cycle.

Pivoted on a stud 136 in the machine frame is a lever 137 having a shoulder engageable in a notch in latch 128. A second lever 138 rotatable and slidable on stud 131 is connected by a link 139 to lever 137, a spring 140 connected to lever 138 tensioning levers 137 and 138 clockwise and lever 138 upwardly. Link 139 is formed with a slot 143 in which is positioned a stud 144 secured to the bail 88. The parts are normally positioned as shown in Figure 3 with the levers 137 and 138 counterclockwise and bail 88 held away from the slides 78 by the engagement of lever 137 in the notch of latch 128. When latch 128 is lifted by the upward motion of aligner link 62 as above set out, lever 137 is free to move clockwise under the urge of spring 140 and the levers 137 and 138 and link 139 move to the positions shown in Figure 5 thereby moving bail 88 into engagement with notches 89 of slides 78 to hold the slides 78 in their amount representing positions during the remaining portion of the machine cycle.

At the end of a machine cycle, shaft 96 is cycled one revolution clockwise to successively operate arms 90 and thereby transfer the amount represented by the positions of slides 78 to the indexing mechanism. Secured to the left end of shaft 96, see Figures 3, 5, 6 and 12 is a disc 145 with a clutch pawl 146 pivoted thereon and urged clockwise by a spring 147. Freely rotatable on shaft 96 is a ratchet 148 secured to a gear 149 which meshes with another gear 150 on a stud 151. Gear 150 may be driven in any convenient manner, either by a connection to the usual accounting machine motor or by a separate motor. A clutch release lever 154 pivoted on a stud 153 in the machine frame is connected by a link 155 to link 139 and is normally positioned in engagement with pawl 146 to retain the pawl disengaged from ratchet 148. Clutch disc 145 is formed with a notch 156′, see Figure 6, which in the normal position of the disc is engaged by a projection on a detent arm 156, Figures 3 and 12, to hold shaft 96 in its home position and clutch pawl 146 against release lever 154. A spring 157 connected to detent arm 156 holds the arm constantly in engagement with disc 145.

Clutch pawl 146 is released to engage ratchet 148 for one revolution at the completion of the accounting machine cycle. Referring to Figure 1, arm 39 on main shaft 37 has pivoted thereon a link 160. The lower end of link 160 connects to an arm 161 pivoted on shaft 44. This arm 161 is pivotally connected to the lower end of a link 162a, which is link 652, Figure 34, of the above Sundstrand Patent No. 2,194,270 and is moved upwardly and then downwardly during a machine cycle. Pivoted on a stud 162 in the machine frame is an arm 163, Figures 3, 5 and 6, urged counterclockwise by a spring 164 to hold a bent-off ear 165 of the arm 163 against the forward end of arm 161. A stud 166 in the frame limits the counterclockwise movement of arm 163 to the position of Figure 5. When latch 128 releases lever 137 at the mid-point of a machine cycle, the upper end of lever 138 connected thereto moves under a square stud 167 of arm 163 as shown in Figure 5. At the end of the machine cycle the forward end of arm 161 is lowered as above described to contact ear 165 of arm 163 and depress lever 138 on stud 131. This motion is transmitted through link 139 rocking about its connection with lever 137 to lift link 155 and rock release lever 154 from under clutch pawl 146, thereby engaging shaft 96 with ratchet 148 for one revolution.

Near the end of one revolution of shaft 96, the above described control elements 137, 138, 139, 154 and bail 88 are restored to their normal positions. Secured to bail 88 and also pivoted on shaft 87 is a lever 168 having a cam nose at its upper end. When bail 88 is released from latch 128, 137 and rocked to engage slides 78, the cam nose of lever 168 is moved into the path of a lug 169 on shaft 96. Shortly before the end of the ensuing revolution of shaft 96, the lug 169 strikes the cam nose to rock lever 168 counterclockwise and withdraw bail 88 from slides 78. This withdrawal of bail 88 moves link 139 to the right, Figures 3, 5 and 6, to move the upper end of lever 138 from under stud 167 and to shift lever 137 into position for latching by latch 128. Release of lever 138 from stud 167 enables spring 140 to raise lever 138 and rock link 139 to again position release lever 154 in the path of clutch pawl 146 and arrest rotation of shaft 96 at its home position. Release of bail 88 from slides 78 frees the slides to the action of their springs 79, Figure 1, whereupon the slides drop down to their home positions.

Restoration of zero elimination mechanism

The zero elimination mechanism previously described is restored to an eliminating condition when link 139 is actuated to relatch lever 137. It will be recalled that rod 109 is shifted to enable zeros to be indexed on zero key 31 when any other digit slide 67 is actuated. The lower arm 110 secured to this rod 109 has an outward slotted portion which embraces the upper end of a lever 170 pivoted on stud 153. The lower end of this lever 170 is, when rod 109 is shifted to engage interponent 103 with slide 101, immediately in front of stud 144 of bail 88. As rod 109 is shifted at some time during rotation of shaft 96 and stud 144 is moved rearwardly at this time, there will be no interference with the shifting of rod 109. At the end of the revolution of shaft 96 when lever 168 is rocked by lug 169, stud 144 strikes the lower end of lever 170 to restore rod 109 to the normal, zero eliminating position.

Should a separate motor be used to drive gear 150 to cycle shaft 96, the motor may be energized to drive gear 150 only when needed. For this purpose, a stud 167 on link 139 is provided to operate a switch 171, Figure 12, provided in the power circuit of such motor. With this arrangement, gear 150 will be driven only during engagement of clutch pawl 146 with ratchet 148.

Automatic cycle initiation

After a total has been printed, the carriage of the machine of the above patent is usually released for tabulation to a succeeding columnar position and in the present embodiment, the carriage is held in the succeeding column until the total has been re-indexed by operation of shaft 96. It is then desirable to initiate another machine cycle to enter into selected registers the amount so set up. To start such an automatic cycle, shaft 96 is provided with a cam lug 172 on its right end, see Figures 12 and 13. An arm 173 pivoted on the machine frame is formed with a lug 174 which immediately prior to the end of the rotation of shaft 96 will be struck by lug 172 to rock arm 173 counterclockwise, Figure 13. A second lever 175 pivoted on the main frame has one arm connected by a link 176 to the end of arm 173 and has its other arm engaging a stud 177 in a link 178. Link 178 is part 589 shown in Figure 70 of the above noted Sundstrand Patent No. 2,194,270, and when moved leftward in Figure 13 will initiate a machine cycle. This cycle will be initiated by shaft 96 through arm 173 and lever 175 after the amount last printed has been re-indexed and will serve to re-enter such amount into the machine.

Summary

A re-indexing control block 118 is placed on the carriage to be effective in the columnar position in which the amount to be re-indexed is printed. The elevation of the type bars 16 to the printing point positions the slides 78 to the desired positions. After these slides 78 are so positioned, latch 128 is released by slide 62 from the aligner bar 48 to retain slides 78 in their set positions. At the end of the machine cycle, lever 139 is rocked by lever 138 to release clutch pawl 146 for one revolution of shaft 96. Drum 95 on shaft 96 operates arms 81 seriatim from the highest to the lowest denominational orders to operate the slides 67 with which they are aligned and thereby selectively operate the keys 31. A zero elimination device is provided for the slide 67 representing zero to permit automatic operation of the zero key 31 only after a slide 67 representing a significant digit has been operated. Near the end of rotation of shaft 96 and after all arms 81 have been operated to re-index the printed amount, a lug on the shaft restores the initiating parts to their normal latched positions in readiness for a further re-indexing cycle. In the meantime, the carriage has been released in the conventional manner for tabulation to a new columnar position and as nothing need be done to further condition the machine, an entry cycle is automatically initiated to enter into the registers the amount indexed by operation of keys 31.

The above description of a preferred embodiment of my invention is not to be taken as limiting the scope of my invention to the structure shown for the showing is illustrative only and many variations and substitutions are possible without departing from the scope of the invention as set out in the following claims.

What is claimed is:

1. An accounting machine of the class described comprising cycling means, printing members having a home position and movable therefrom to printing positions, amount indexing means to control movement of said printing members from said home position in amount entering operations, a register to receive entries from said printing members and to control movement of said printing members from home position in total printing operations, a plurality of settable means, each means differentially set by movement of one of said printing members from home position during a cycle of said cycling means, a holding member operative during a predetermined total printing operation to retain all said settable means in differentially set position during restoration of said printing members to home position, means common to said differentially set means to selectively operate said amount indexing means, and a power means operable while said printing members are in home position to sequentially engage each said differentially set means with said common means to operate said common means and thereby transfer the differential settings of said printing members during said total printing operation to said amount indexing means.

2. In an accounting machine of the class described having printing members, amount indexing means, a register, and cyclically operating means to advance said printing members to amount representing positions under control of said amount indexing means or said register and to return said printing members to a home position, the combination of a settable member movable with each printing member in advance and return directions, a holding member operable during predetermined cycles of said cyclically operating means to retain said settable members in amount representing positions during return of said printing members, digital members common to said amount indexing means and said settable members, each of said settable members when set to amount representing positions being aligned with the one of said digital members corresponding to the amount represented, and power means to sequentially engage said settable members with the aligned digital member to operate the amount indexing means.

3. In an accounting machine of the class described having amount printing members, cyclically operating means to advance said printing members to a printing position and to restore them to a home position, amount indexing means including a set of ten digit keys to limit advance movement of said printing members, and a register engageable with said printing members to receive entries therefrom and to limit advance of said printing members in total printing operations, the combination of a plurality of operating members, one connected to each digit key to operate said key, a settable member engaged by each printing member during its advance movement and normally retracted therewith, means operable during selected total printing operations to hold said settable members in amount representing positions, an actuating member moved by said settable member into alignment with the operating member for the digit key corresponding to the digit represented by the position of said settable member, and power means to operate said actuating members sequentially from the highest to the lowest denominational order to actuate the aligned operating members and the digit keys connected therewith.

4. The invention as set forth in claim 3 including an interponent on said operating member for the "zero" digit key, said interponent being normally set in an ineffective position so that actuation of said operating member will not operate said "zero" digit key, and an arm connected to said interponent, said arm operable by any other operating member upon actuation thereof to set said interponent to an effective position whereby succeeding actuations of said operating member will be effective to operate said "zero" digit key.

5. An accounting machine of the class described comprising printing members, cycling means to advance said printing members to printing positions and restore them to a home position, index members settable to limit advance movement of said printing members, a plurality of digit keys to set said index members to represent an amount to be printed, a register engageable with said printing members to receive amounts therefrom and to limit advance of said printing members in total printing operations, a plurality of settable slides, each slide engageable by a printing member to be moved into an amount representing position and yieldingly restored by said printing member, a holding member engageable with said settable slides during selected total printing cycles to retain said slides in amount representing positions during restoration of said printing members, an actuating member on each settable slide, operating members common to all said actuating members and each connected to one of said digit keys, said actuating members being normally aligned with one of said operating members and moved by said settable slides into alignment with the operating member for the digit key corresponding to the digit printed by the printing member connected with said slide, power means operating said actuating members seriatim from the highest to the lowest denominational order, and a control linkage operated by said cycling means at the end of a cycle thereof to initiate an operation of said power means.

6. A re-indexing mechanism as set forth in claim 5 including means to prevent actuation of the digit key representing zero for each non-significant zero in the amount represented by the positions of said settable slides comprising an interponent on said operating member for the zero key, said interponent being normally set to prevent actuation of said zero digit key by said operating member, means engageable by the remaining operating members to set said interponent to an effective position and means operated by said power means near the end of its period of operation to reset said interponent into the actuation preventing position.

7. A re-indexing mechanism as set out in claim 5, including means to prevent actuation of the digit key representing zero for each non-significant zero in the amount represented by the positions of said settable slides comprising an interponent on the operating member for said zero key, said interponent being normally ineffective to transmit motion from said operating member to said zero key, an arm connected to said interponent and engageable by any operating member for a significant digit upon actuation thereof to move said interponent to an effective position wherein subsequent actuation of its operating member will operate the zero key, means to retain said interponent in each position, and means operated by said power means to restore said interponent to the ineffective position after all actuating members have been operated.

8. An accounting machine of the class described including printing members, cyclic means to advance said printing members to printing positions and to restore them to a home position, amount indexing means including a zero key and a plurality of other number keys, a slide engaged by each printing member in its advance movement and movable therewith into an amount representing position, operating members each connected to one of said keys, actuating members on said slides, each actuating member being normally aligned with the operating member connected to the zero key and being selectively alignable by its slide with an operating member for one of the number keys, a holding member engageable with said slides to retain said slides and actuating members in advanced positions, control means, mechanism operated by said control means and by said cyclic means when said printing members are in an advanced position to engage said holding member with said slides, power driven means to operate said actuating members seriatim from the highest denomination downwardly to thereby operate the keys corresponding to the amount represented by the positions of said slides, and energizing means for said power driven means controlled by said cyclic means at the end of a cycle thereof through said holding member operating mechanism when said holding member is engaged with said slides.

9. An accounting machine of the class described having printing members movable from a home to digital amount printing positions, cyclic means to advance said printing members to printing positions and to restore them to home position, amount indexing means including a zero key and a plurality of other number keys, a plurality of members each operable to cause actuation of one of said other number keys, a member including a normally ineffective interponent to cause actuation of said zero key, a plurality of settable slides, each slide selectively settable into positions representing the different digits and yieldingly restored to a home position by said movements of said printing members, an actuating member on each slide, said actuating members being normally all aligned with the member to actuate the zero key and alignable by movement of its slide with the member connected to the number key corresponding to the position represented by the position of its slide, means to hold all of said slides in their advanced positions, control means, a linkage actuated under control of said control means and said cyclic means when said printing members are in printing positions to engage said holding means with said slides, power means to move said actuating members seriatim to operate said key actuating members, and means including said linkage to energize said power means after said printing members are restored to their home position.

10. The mechanism as claimed in claim 9 including a member connected to said interponent and operated by the members causing actuation of said other number keys to render said interponent effective to enable actuation of said zero key by its member, and means on said power means to restore said member connected to said interponent and said linkage to normal positions.

11. An accounting machine of the class described having amount printing members cyclically operated from a home to printing positions and restored to home position, a plurality of numeral keys including a zero key, slides driven by said printing members during their movement to printing positions and yieldingly restored therewith, means operative during selected printing operations to retain said slides in their advanced positions as said printing members return to home position, and power operated means controlled by said slides in their advanced positions to operate said keys seriatim to re-index on said keys the amount printed from said printing members, said power operated means including a device normally ineffective to operate said zero key and rendered effective by operation of any other key.

References Cited in the file of this patent
UNITED STATES PATENTS

| | | |
|---|---|---|
| 2,453,932 | Pitman | Nov. 16, 1948 |
| 2,497,784 | Mehan et al. | Feb. 14, 1950 |